US008711368B2

(12) United States Patent
Matsuno (10) Patent No.: US 8,711,368 B2
(45) Date of Patent: Apr. 29, 2014

(54) PROMPT GAP VARYING OPTICAL FILTER, ANALYTICAL INSTRUMENT, OPTICAL DEVICE, AND CHARACTERISTIC MEASUREMENT METHOD

(75) Inventor: Yasushi Matsuno, Matsumoto (JP)

(73) Assignee: Seiko Epson Corporation (JP)

(*) Notice: Subject to any disclaimer, the term of this patent is extended or adjusted under 35 U.S.C. 154(b) by 440 days.

(21) Appl. No.: 12/986,394

(22) Filed: Jan. 7, 2011

(65) Prior Publication Data

US 2011/0176128 A1 Jul. 21, 2011

(30) Foreign Application Priority Data

Jan. 21, 2010 (JP) ................................ 2010-010716

(51) Int. Cl.
*G01B 9/02* (2006.01)
(52) U.S. Cl.
USPC ........................................................ 356/519
(58) Field of Classification Search
USPC .......................................... 356/454, 506, 519
See application file for complete search history.

(56) References Cited

U.S. PATENT DOCUMENTS

| 4,859,060 | A * | 8/1989 | Katagiri et al. ............... 356/454 |
| 6,822,798 | B2 * | 11/2004 | Wu et al. ......................... 359/578 |
| 6,934,033 | B2 * | 8/2005 | McDaniel et al. ............. 356/454 |
| 7,161,728 | B2 * | 1/2007 | Sampsell et al. .............. 359/291 |
| 2005/0007933 | A1 | 1/2005 | Yoda |
| 2007/0242920 | A1 | 10/2007 | Lin et al. |
| 2007/0273888 | A1 * | 11/2007 | Kamihara ..................... 356/454 |
| 2009/0306479 | A1 * | 12/2009 | Kamihara ..................... 600/180 |
| 2010/0097613 | A1 * | 4/2010 | Saari ............................. 356/454 |
| 2011/0075245 | A1 * | 3/2011 | Hashimura et al. .......... 359/291 |

FOREIGN PATENT DOCUMENTS

| JP | 02-140028 | 5/1990 |
| JP | 11-142752 | 5/1999 |
| JP | 2003-014641 A | 1/2003 |
| JP | 2007-004074 A | 1/2007 |
| JP | 2009-244498 A | 10/2009 |
| WO | 2009-102323 | 8/2009 |

OTHER PUBLICATIONS

Extended European Search Report, pp. 1-8, May 19, 2011.

* cited by examiner

*Primary Examiner* — Tarifur Chowdhury
*Assistant Examiner* — Michael P Lapage
(74) *Attorney, Agent, or Firm* — Harness, Dickey & Pierce, P.L.C.

(57) ABSTRACT

An optical filter includes a first substrate, a second substrate opposed to the first substrate, a first reflecting film provided to the first substrate, a second reflecting film provided to the second substrate, and opposed to the first reflecting film, a first electrode provided to the first substrate, a second electrode provided to the second substrate, and opposed to the first electrode, and a voltage control section adapted to control an electrical potential difference between the first electrode and a second electrode, and when switching a wavelength of a light beam to be dispersed by switching the electrical potential difference between the first electrode and the second electrode, and measuring an intensity of the light beam dispersed, the voltage control section switches the electrical potential difference from a first electrical potential difference to a second electrical potential difference larger than the first electrical potential difference.

11 Claims, 5 Drawing Sheets

| NUMBER DATA | VOLTAGE DATA | TIME DATA |
|---|---|---|
| 1 | $V_1$ | $T_1$ |
| 2 | $V_2$ | $T_2$ |
| 3 | $V_3$ | $T_3$ |
| 4 | $V_4$ | $T_4$ |
| ⋮ | ⋮ | ⋮ |
| i − 1 | $V_{i-1}$ | $T_{i-1}$ |
| i | $V_i$ | $T_i$ |
| i + 1 | $V_{i+1}$ | $T_{i+1}$ |
| ⋮ | ⋮ | ⋮ |
| N | $V_N$ | $T_N$ |

PROMPT GAP VARYING OPTICAL FILTER, ANALYTICAL INSTRUMENT, OPTICAL DEVICE, AND CHARACTERISTIC MEASUREMENT METHOD

BACKGROUND

1. Technical Field

The present invention relates to an optical filter for measuring the characteristic of an incident light, characteristic measurement method using the optical filter, an analytical instrument equipped with the optical filter, and an optical device equipped with the optical filter.

2. Related Art

In the past, there has been known a variable wavelength interference filter provided with a pair of reflecting films disposed so as to be opposed to each other with a gap therebetween, and for dispersing the light with a desired wavelength from the incident light by varying the size of the gap (see, e.g., JP-A-11-142752 (Document 1)).

The variable wavelength interference filter described in Document 1 is provided with a pair of substrates, and a pair of multilayer films (reflecting films) disposed on the respective surfaces of the substrates opposed to each other. Further, electrostatic drive electrodes are formed respectively on the pair of reflecting films of variable wavelength interference filter, and it is arranged that the distance between the gaps can be adjusted by applying a voltage to the electrostatic drive electrodes.

Incidentally, in a spectral measurement device equipped with the variable wavelength interference filter as described in Document 1 mentioned above, the voltage applied to the electrostatic drive electrodes of the variable wavelength interference filter is switched to thereby switch the wavelength of the light to be dispersed, and then the intensity of the light thus dispersed is measured. On this occasion, there arises a problem that when switching the voltage to be applied to the electrostatic drive electrodes from a high voltage to a low voltage, it takes much time for the gap spacing of the pair of reflecting films to reach the desired value. In other words, an electrostatic attractive force F caused by the electrostatic drive electrodes is expressed by a function of the applied voltage and the distance (an opposed electrode distance) between the pair of electrostatic drive electrodes as shown in Formula 1 below.

$$F(x, V) = \alpha \left( \frac{V}{g-x} \right)^2 \quad (1)$$

Here, in Formula 1, "V" denotes the applied voltage to the electrostatic drive electrodes, "g" denotes the opposed electrode distance in the initial state with no voltage applied, "x" denotes a relative displacement amount of the pair of electrostatic drive electrodes, and "α" denotes a constant. As expressed by Formula 1 described above, since the electrostatic attractive force F is inversely proportional to the opposed electrode distance $(g-x)^2$, the larger the opposed electrode distance is, the weaker the electrostatic attractive force F becomes. Therefore, in the case of switching the voltage to be applied to the electrostatic drive electrodes from a high voltage to a low voltage to thereby make the electrostatic attractive force F act so as to increase the opposed electrode distance, the electrostatic attractive force F suddenly becomes weak at the switching timing of the voltage. On the other hand, a restoring force for restoring the substrate to the initial state acts on the substrate provided with the electrostatic drive electrode as a reactive force of the electrostatic attractive force F when applying the high voltage. Therefore, when switching the voltage to be applied to the electrostatic drive electrodes from the high voltage to the low voltage, the restoring force becomes stronger than the electrostatic attractive force F at the switching timing, and there occurs a so called overshoot, namely the fluctuation of the gap spacing exceeding the desired value. Since a free damped vibration is caused in the substrate provided with the electrostatic drive electrode if such an overshoot occurs, there arises a problem that the measurement is not achievable until the fluctuation in the gap spacing is eliminated, which hinders prompt spectral measurement.

SUMMARY

An advantage of some aspects of the invention is to provide an optical filter, an analytical instrument, an optical device, and characteristic measurement method each capable of prompt spectral measurement.

According to an aspect of the invention, there is provided an optical filter including a first substrate, a second substrate opposed to the first substrate, a first reflecting film provided to the first substrate, a second reflecting film provided to the second substrate, and opposed to the first reflecting film, a first electrode provided to the first substrate, a second electrode provided to the second substrate, and opposed to the first electrode, and a voltage control section adapted to control an electrical potential difference between the first electrode and a second electrode, wherein the voltage control section switches the electrical potential difference from a first electrical potential difference to a second electrical potential difference larger than the first electrical potential difference.

The aspect of the invention includes both of the configuration in which the either one of the first and second substrates is distorted toward the other thereof to thereby vary the distance between the first and second reflecting films, and the configuration in which both of the first and second substrates are distorted in a direction of coming closer to each other to thereby vary the distance between the first and second reflecting films.

In this aspect of the invention, the voltage control section switches the electrical potential difference from the first electrical potential difference to the second electrical potential difference larger than the first electrical potential difference. Specifically, when dispersing light beams with wavelengths different from each other from the incident light beam entering the spectral measurement device and then measuring the intensities of the light beams, the voltage control section firstly sets the electrical potential difference between the first electrode and the second electrode to the first electrical potential difference to thereby transmit the light beam (the first light beam) having a first wavelength. Subsequently, the electrical potential difference between the first and second electrodes is set to the second electrical potential difference larger than the first electrical potential difference to thereby transmit the light beam (the second light beam) having the second wavelength shorter than the first wavelength.

Here, when switching it from the second electrical potential difference to the first electrical potential difference smaller than the second electrical potential difference, the restoring force at the second electrical potential difference becomes stronger than the electrostatic attractive force at the first electrical potential difference as described above. Therefore, the time period of the free damped vibration of the substrate due to the generation of the overshoot becomes longer, which hinders the prompt execution of the light characteristic measurement. In contrast thereto, according to this aspect of the invention, since the voltage control section switches it from the first electrical potential difference to the second electrical potential difference larger than the first electrical potential difference, the free damped vibration of the substrate can be prevented to thereby perform the prompt spectral measurement.

In the aspect of the invention, it is preferable that a time period during which the second electrical potential difference is set is longer than a time period during which the first electrical potential difference is set.

According to this configuration, the period during which the second electrical potential difference is set is longer than the period during which the first electrical potential difference is set. When setting the electrical potential difference between the first electrode and the second electrode to the second electrical potential difference larger than the first electrical potential difference, since the restoring force of the substrate also becomes strong, the time period before the substrate settles might increase in some cases. In other words, the time period before the gap spacing settles in place might be longer in some cases. In contrast thereto, by setting the period of the second electrical potential difference longer than the period of the first electrical potential difference, it becomes possible to make the gap spacing settle in place.

In the optical filter of the aspect of the invention, it is preferable that the voltage control section applies a first voltage to the first electrode when setting the first electrical potential difference, and applies a second voltage to the first electrode when setting the second electrical potential difference, the first voltage is a first direct-current voltage, and the second voltage is a second direct-current voltage.

According to this configuration, by applying the direct-current voltage as a constant voltage to the first electrode when setting the first electrical potential difference, and further applying the direct-current voltage to the first electrode when setting the second electrical potential difference, it becomes possible to stably keep the gap spacing compared to the case of using an alternating-current voltage.

In the optical filter of the aspect of the invention, it is preferable that a light receiving section adapted to receive a light beam transmitted through the first reflecting film and the second reflecting film, and a measurement section adapted to measure a received light intensity of the light beam received by the light receiving section are also provided, and the measurement section measures the received light intensity of a first light beam transmitted through the first reflecting film and the second reflecting film when the first electrical potential difference is set, and measures the received light intensity of a second light beam transmitted through the first reflecting film and the second reflecting film when the second electrical potential difference is set.

According to this configuration, the intensity of the light beam transmitted through the first reflecting film and the second reflecting film can be measured in each of the case in which the electrical potential difference between the first electrode and the second electrode is set to the first electrical potential difference, and the case in which the electrical potential difference is set to the second electrical potential difference. Further, as described above, by switching the electrical potential difference from the first electrical potential difference with a low voltage to the second electrical potential difference with a high voltage to thereby sequentially decreasing the distance between the first reflecting film and the second reflecting film, it is possible to more promptly measure the intensity of the light beams of the respective wavelength components included in the incident light beam.

In the optical filter of the aspect of the invention, it is preferable that the voltage control section is capable of further setting the electrical potential difference between the first electrode and the second electrode to a third electrical potential difference larger than the second electrical potential difference, and switches the electrical potential difference from the second electrical potential difference to the third electrical potential difference, and an absolute value of a difference between the second electrical potential difference and the third electrical potential difference is smaller than an absolute value of a difference between the first electrical potential difference and the second electrical potential difference.

As is understood from Formula 1, the electrostatic attractive force is proportional to the square of the electrical potential difference. Therefore, when switching the electrical potential difference in the ascending direction of the electrical potential difference, namely to the first electrical potential difference, the second electrical potential difference, and then the third electrical potential difference, if the absolute value of the difference between the first electrical potential difference and the second electrical potential difference and the absolute value of the difference between the second electrical potential difference and the third electrical potential difference are the same, it results that the electrostatic attractive force increases rapidly, which causes the overshoot. Here, in this configuration, the absolute value of the difference between the second electrical potential difference and the third electrical potential difference is smaller than the absolute value of the difference between the first electrical potential difference and the second electrical potential difference. According to this configuration, the rapid increase in the electrostatic attractive force when the gap spacing is narrowed can be prevented, thus the overshoot can further be prevented, and therefore, the prompter spectral measurement can be performed.

In the optical filter of the aspect of the invention, it is preferable that the voltage control section is capable of further setting the electrical potential difference between the first electrode and the second electrode to a third electrical potential difference larger than the second electrical potential difference, and switches the electrical potential difference from the second electrical potential difference to the third electrical potential difference, a first spacing is set between the first reflecting film and the second reflecting film when the first electrical potential difference is set, a second spacing smaller than the first spacing is set between the first reflecting film and the second reflecting film when the second electrical potential difference is set, a third spacing smaller than the second spacing is set between the first reflecting film and the second reflecting film when the third electrical potential difference is set, and an absolute value of a difference between the first spacing and the second spacing is equal to an absolute value of a difference between the second spacing and the third spacing.

According to this configuration, the voltage control section sets the first electrical potential difference, the second electrical potential difference, and the third electrical potential difference so that the absolute value of the difference between the first spacing and the second spacing can be equal to the absolute value of the difference between the second spacing and the third spacing. In other words, when raising the voltage applied between the first electrode and the second electrode from the first electrical potential difference to the second electrical potential difference, and further the third electrical potential difference, the narrower the spacing (the gap spacing between the first reflecting film and the second reflecting film) between the first electrode and the second electrode becomes, the larger the decrease in the spacing with respect to the increase in the electrical potential difference becomes. Therefore, when changing the electrical potential difference sequentially from the first electrical potential difference to the second electrical potential difference, and further the third electrical potential difference, if the increment of the electrical potential difference is constant, the variation from the second spacing to the third spacing becomes larger than the variation from the first spacing to the second spacing. In this case, with respect to the light beam having a longer wavelength, which is dispersed in the case of setting the large spacing between the first reflecting film and the second reflecting film, the variation of the wavelength of the transmitted light beam caused when switching the electrical potential difference is small, and therefore, the detailed measurement of the light characteristics can be performed. However, as the spacing between the first reflecting film and the second reflecting film decreases, the variation of the wavelength of the transmitted light beam increases, and therefore, the measurement result of the light characteristics becomes coarser. In contrast thereto, by reducing the increment of the electrical potential difference as switching the electrical potential difference to the larger electrical potential difference so that the absolute value of the difference between the first spacing and the second spacing becomes equal to the absolute value of the difference between the second spacing and the third spacing as described above, it is possible to section the measurable wavelength band at regular wavelength intervals, and therefore, it becomes possible to perform the detailed characteristic measurement throughout the entire measurable wavelength band.

On this occasion, in the optical filter of the aspect of the invention, it is preferable that an absolute value of a difference between the second electrical potential difference and the third electrical potential difference is smaller than an absolute value of a difference between the first electrical potential difference and the second electrical potential difference.

In this configuration, similarly to the above configuration, by reducing the increment of the electrical potential difference as switching the electrical potential difference to the larger electrical potential difference so that the absolute value of the difference between the first spacing and the second spacing becomes equal to the absolute value of the difference between the second spacing and the third spacing as described above, it is possible to section the measurable wavelength band at regular wavelength intervals, and therefore, it becomes possible to perform the detailed characteristic measurement throughout the entire measurable wavelength band.

In the optical filter of the aspect of the invention, it is preferable that a capacitance measurement section adapted to measure a capacitance between the first electrode and the second electrode is also provided.

According to this configuration, by making the capacitance measurement section measure the capacitance, the distance between the first electrode and the second electrode can accurately be detected. Further, if the film thickness of each of the first reflecting film and the second reflecting film is previously measured, it is possible to accurately calculate the gap spacing as the distance between the first reflecting film and the second reflecting film based on the distance between the first electrode and the second electrode, and the film thickness of each of the first reflecting film and the second reflecting film, and therefore, the wavelength of the light beam transmitted through the optical filter can accurately be obtained.

According to another aspect of the invention, there is provided a characteristic measurement method adapted to measure a characteristic of a measurement object, including the steps of (a) providing an etalon including a first substrate, a second substrate opposed to the first substrate, a first reflecting film provided to the first substrate, a second reflecting film provided to the second substrate and opposed to the first reflecting film, a first electrode provided to the first substrate, and a second electrode provided to the second substrate and opposed to the first electrode, and an optical filter including a voltage control section adapted to set an electrical potential difference between the first electrode and the second electrode to one of a first electrical potential difference and a second electrical potential difference larger than the first electrical potential difference, a light receiving section adapted to receive a light beam transmitted through the etalon, and a measurement section adapted to measure an intensity of the light received by the light receiving section, (b) irradiating the measurement object with a light beam, (c) setting, by the voltage control section, the first electrical potential difference, and taking out a first light beam from a light beam entering the etalon after being one of transmitted through and reflected by the measuring object, (d) receiving the first light beam by the light receiving section and measuring, by the measurement section, a received light intensity of the first light beam received, (e) setting, by the voltage control section, the second electrical potential difference instead of the first electrical potential difference, and taking out a second light beam from the light beam entering the etalon after being one of transmitted through and reflected by the measuring object, and (f) receiving the second light beam by the light receiving section and measuring, by the measurement section, a received light intensity of the second light beam received.

According to this aspect of the invention, after irradiating the measurement object with the light beam in the light irradiation step (step (b)), the electrical potential difference between the first electrode and the second electrode is set to the first electrical potential difference to adjust the gap spacing in the first voltage control step (step (c)), and the received light intensity of the first light beam transmitted through the first reflecting film and the second reflecting film having the gap spacing set in the first voltage control step (step (c)) is measured in the first measurement step (step (d)). Subsequently, the second electrical potential difference larger than the first electrical potential difference is applied between the first electrode and the second electrode in the second voltage control step (step (e)), and then the received light intensity of the second light beam transmitted on that occasion is measured in the second measurement step (step (f)).

As described above, by performing the measurement step of the received light beam after switching the electrical potential difference from the small electrical potential difference to the large electrical potential difference as described above, similarly to the aspect of the invention described above, the free damped vibration of the substrate can be suppressed, and the prompt characteristic measurement can be performed.

In the characteristic measurement method of the aspect of the invention, it is preferable that a time period during which the second electrical potential difference is set in the second voltage control step (step (e)) is longer than a time period during which the first electrical potential difference is set in the first voltage control step (step (c)).

In this aspect of the invention, similarly to the above aspect of the invention, by setting the period of the second electrical potential difference longer than the period of the first electrical potential difference, it becomes possible to make the gap spacing settle in place.

In the characteristic measurement method of the aspect of the invention, it is preferable that a first voltage is applied to the first electrode in the first voltage control step (step (c)), and a second voltage is applied to the first electrode in the second voltage control step (step (e)), the first voltage is a first direct-current voltage, and the second voltage is a second direct-current voltage.

According to this configuration, similarly to the above aspect of the invention, by using the direct-current voltage as the voltage applied to the first electrode and the second electrode, the vibration of the substrate caused in the case of using the alternating-current voltage can be eliminated, and the gap spacing can be maintained stably.

In the characteristic measurement method of the aspect of the invention, it is preferable that there are further provided the steps of (g) setting, by the voltage control section, the electrical potential difference between the first electrode and the second electrode to a third electrical potential difference larger than the second electrical potential difference, and taking out a third light beam from the light beam entering the etalon after being one of transmitted through and reflected by the measuring object after the second measurement step (step (f)), and (h) receiving the third light beam by the light receiving section and measuring, by the measurement section, a received light intensity of the third light beam received, and an absolute value of a difference between the second electrical potential difference and the third electrical potential difference is smaller than an absolute value of a difference between the first electrical potential difference and the second electrical potential difference.

According to this configuration, the rapid increase in the electrostatic attractive force when the gap spacing is narrowed can be prevented, thus the overshoot can further be prevented, and therefore, the prompter spectral measurement can be performed.

In the characteristic measurement method of the aspect of the invention, it is preferable that there are further provided the steps of (g) setting, by the voltage control section, the electrical potential difference between the first electrode and the second electrode to a third electrical potential difference larger than the second electrical potential difference, and taking out a third light beam from the light beam entering the etalon after being one of transmitted through and reflected by the measuring object after the second measurement step (step (f)), and (h) receiving the third light beam by the light receiving section and measuring, by the measurement section, a received light intensity of the third light beam received, wherein a first spacing is set between the first reflecting film and the second reflecting film in the first voltage control step (step (c)), a second spacing smaller than the first spacing is set between the first reflecting film and the second reflecting film in the second voltage control step (step (e)), a third spacing smaller than the second spacing is set between the first reflecting film and the second reflecting film in the third voltage control step (step (g)), and an absolute value of a difference between the first spacing and the second spacing is equal to an absolute value of a difference between the second spacing and the third spacing.

In this configuration, similarly to the above aspect of the invention, by reducing the increment of the electrical potential difference as switching the electrical potential difference to the larger electrical potential difference so that the absolute value of the difference between the first spacing and the second spacing becomes equal to the absolute value of the difference between the second spacing and the third spacing as described above, it is possible to section the measurable wavelength band at regular wavelength intervals, and therefore, it becomes possible to perform the detailed characteristic measurement throughout the entire measurable wavelength band.

In the characteristic measurement method of the above aspect of the invention, it is preferable that the optical filter includes a capacitance measurement section adapted to measure a capacitance between the first electrode and the second electrode, in the first measurement step (step (d)), the capacitance measurement section measures a capacitance between the first electrode and the second electrode in addition to measuring the received light intensity of the first light beam, and in the second measurement step (step (f)), the capacitance measurement section measures a capacitance between the first electrode and the second electrode in addition to measuring the received light intensity of the second light beam.

According to this configuration, by making the capacitance measurement section measure the capacitance, the distance between the first electrode and the second electrode can accurately be detected. Further, if the film thickness of each of the first reflecting film and the second reflecting film is previously measured, it is possible to accurately calculate the gap spacing as the distance between the first reflecting film and the second reflecting film based on the distance between the first electrode and the second electrode, and the film thickness of each of the first reflecting film and the second reflecting film, and therefore, the wavelength of the light beam transmitted through the optical filter can accurately be obtained.

Therefore, by measuring the received light intensity of the light beam received by the light receiving section in addition to calculating the gap spacing based on such capacitances in the first measurement step (step (d)) and the second measurement step (step (f)), it is possible to simultaneously obtain the wavelength and the intensity of the light beam received, and therefore, a further detailed characteristic measurement can be performed. Further, by measuring the capacitance between the first electrode and the second electrode in addition to the measurement of the intensity of the third light beam similarly in the third measurement step (step (h)), it is possible to simultaneously measure the wavelength and the intensity of the received light beam with respect to the third light beam.

According to still another aspect of the invention, there is provided an analytical instrument including any one of the optical filters described above.

According to this aspect of the invention, the light beam with the desired wavelength can promptly be taken out using the optical filter. Therefore, also in the analytical instrument, a prompt analysis can be performed based on the light beam thus taken out promptly.

According to yet another aspect of the invention, there is provided an optical device including any one of the optical filters described above.

Here, the optical device is, for example, a device for retrieving data from a desired wavelength in the case in which data corresponding to the light intensity are provided to the light beams of respective wavelengths, and is used, for example, for a system for combining a plurality of light beams of the respective wavelengths and transmitting them via a medium such as an optical fiber.

Since in this aspect of the invention the light beam with the desired wavelength can promptly be extracted by the optical filter as described above, the data retrieving process in the optical device can promptly be performed.

BRIEF DESCRIPTION OF THE DRAWINGS

The invention will be described with reference to the accompanying drawings, wherein like numbers reference like elements.

DESCRIPTION OF EXEMPLARY EMBODIMENT

Embodiment

A colorimetric device as the analytical instrument according to an embodiment of the invention will hereinafter be explained with reference to the accompanying drawings.

1. Configuration of Colorimetric Device

Figure 1:
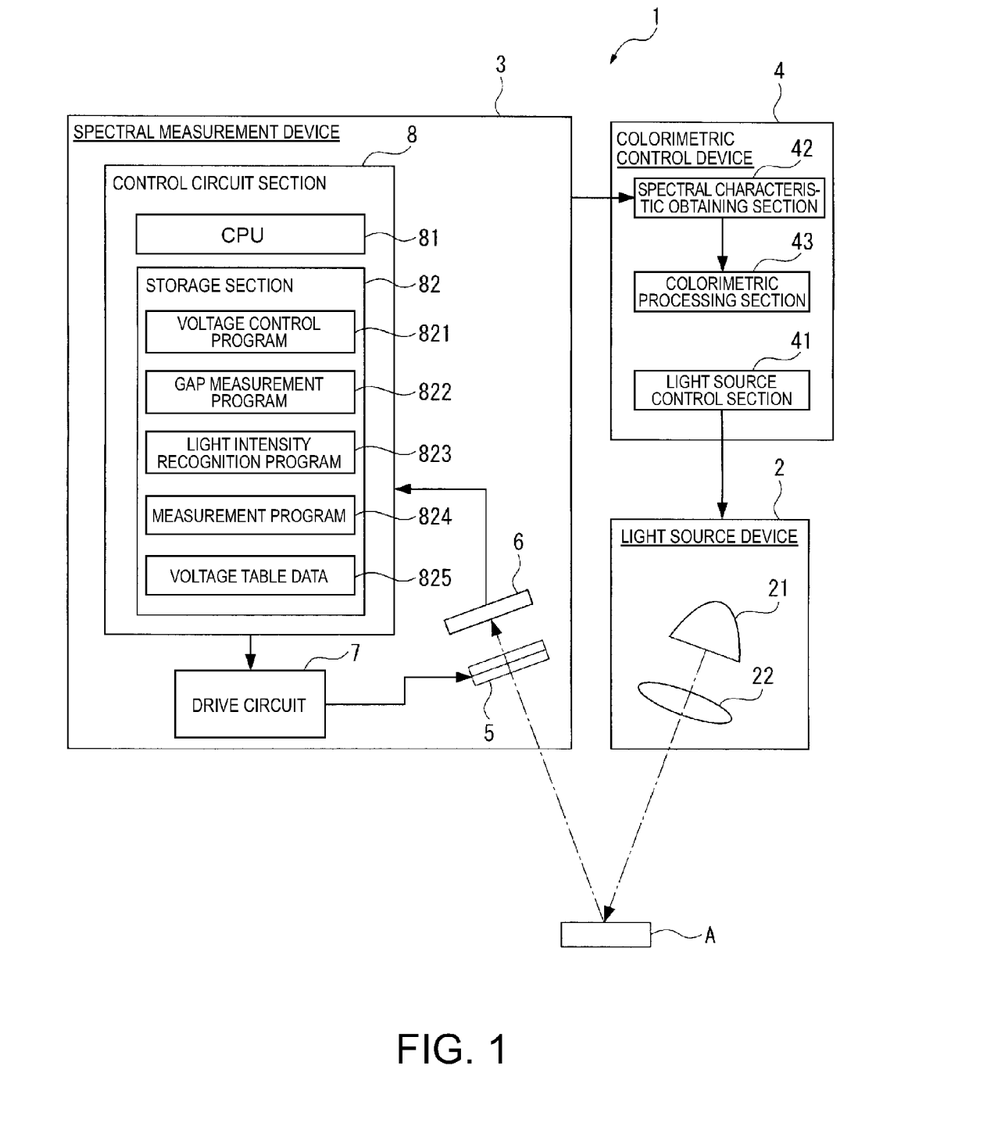
FIG. 1 is a block diagram showing a schematic configuration of a colorimetric device as an analytical instrument according to an embodiment of the invention.

FIG. 1 is a block diagram showing a schematic configuration of the colorimetric device as the analytical instrument according to the embodiment of the invention.

In FIG. 1, the colorimetric device 1 is provided with a light source device 2, a spectral measurement device 3 constituting the optical filter according to the embodiment of the invention, and a colorimetric control device 4. The colorimetric device 1 emits, for example, a white light beam from the light source device 2 toward a measurement object A, and makes a test target light beam, which is a light beam reflected by the measurement object A, enter the spectral measurement device 3. Then, the colorimetric device 1 disperses the test target light beam, and then performs the spectral characteristic measurement for measuring the light intensity of each of the light beams having the respective wavelengths obtained by the dispersion using the spectral measurement device 3. In other words, the colorimetric device 1 makes the test target light beam as a light beam reflected by the measurement object A enter the etalon 5, and then performs the spectral characteristic measurement for measuring the light intensity of the transmitted light beam transmitted through the etalon 5. Then, the colorimetric control device 4 analyzes the colorimetric process of the measurement object A, namely the wavelengths of the colored light beams included therein, and the proportions of the colored light beams, based on the spectral characteristics thus obtained.

2. Configuration of Light Source Device

The light source device 2 is provided with a light source 21 and a plurality of lenses 22 (one of the lenses is shown in FIG. 1), and emits a white light beam to the measurement object A. Further, the plurality of lenses 22 includes a collimator lens, and the light source device 2 modifies the white light beam emitted from the light source 21 into a parallel light beam with the collimator lens, and emits it from the projection lens not shown to the measurement object A.

3. Configuration of Spectral Measurement Device

The spectral measurement device 3 is a device for dispersing the test target light beam reflected by the measurement object A and then measuring the intensity of each the light beams obtained by the dispersion, thereby obtaining the spectral characteristics. As shown in FIG. 1, the spectral measurement device 3 is provided with an etalon 5, a light receiving section 6, a drive circuit 7, and a control circuit section 8. Further, the spectral measurement device 3 has an entrance optical lens not shown disposed at a position opposed to the etalon 5, the entrance optical lens guiding the reflected light beam (the test target light beam) reflected by the measurement object A into the inside thereof.

The light receiving section 6 is composed of a plurality of photoelectric conversion elements, and generates an electric signal corresponding to the received light intensity. Further, the light receiving section 6 is connected to the control circuit section 8, and outputs the electric signal thus generated to the control circuit section 8 as a light reception signal.

3-1. Configuration of Etalon

Figure 2:
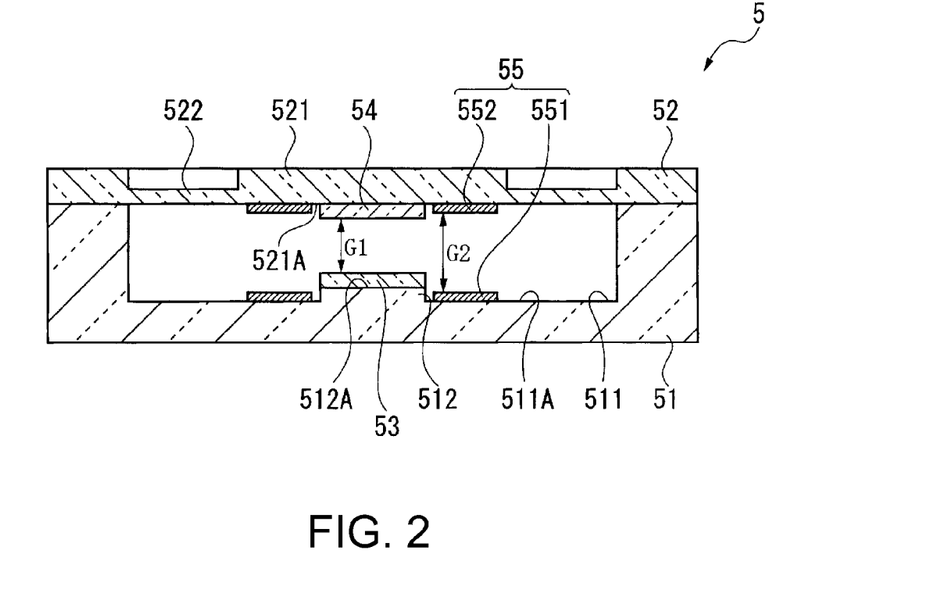
FIG. 2 is a cross-sectional view showing a schematic configuration of an etalon constituting an optical filter according to the present embodiment.

FIG. 2 is a cross-sectional view showing a schematic configuration of the etalon 5 constituting the spectral measurement device 3.

The etalon 5 is, for example, a plate-like optical member having a square planar shape formed to have each side of, for example, 10 mm. As shown in FIG. 2, the etalon 5 is provided with a movable substrate 52 constituting a second substrate according to the invention, and a fixed substrate constituting a first substrate thereof. These two substrates 51, 52 are each made of glass of various types such as soda glass, crystalline glass, quartz glass, lead glass, potassium glass, borosilicate glass, or alkali-free glass, or quartz crystal, for example. Among these materials, a glass containing alkali metal such as sodium (Na) or potassium (K) is preferable for the constituent material of each of the substrates 51, 52, and by making the substrates 51, 52 of such glass, it becomes possible to enhance the adhesiveness of the reflecting films 53, 54 described later, and the electrodes and the bonding strength between the substrates. Further, these two substrates 51, 52 are bonded to each other by, for example, room temperature surface activated bonding to thereby be composed integrally.

Further, a fixed reflecting film 53 constituting a first reflecting film according to the invention and a movable reflecting film 54 constituting a second reflecting film are disposed between the fixed substrate 51 and the movable substrate 52. Here, the fixed reflecting film 53 is fixed to a surface of the fixed substrate 51 opposed to the movable substrate 52, and the movable reflecting film 54 is fixed to a surface of the movable substrate 52 opposed to the fixed substrate 51. Further, the fixed reflecting film 53 and the movable reflecting film 54 are disposed so as to be opposed to each other via a first gap G1.

Further, an electrostatic actuator 55 for controlling the dimension of the first gap G1 between the fixed reflecting film 53 and the movable reflecting film 54 is disposed between the fixed substrate 51 and the movable substrate 52. The electrostatic actuator 55 is provided with a first electrode 551 and a second electrode 552.

3-1-1. Configuration of Fixed Substrate

The fixed substrate 51 is formed by processing a glass substrate formed to have a thickness of, for example, 500 μm using an etching process. Specifically, as shown in FIG. 2, the fixed substrate 51 is provided with an electrode formation groove 511 and a reflecting film fixation section 512 by etching.

The electrode formation groove 511 is formed to have an annular shape in a plan view (hereinafter referred to as an etalon-plan view) in which the etalon 5 is viewed in the thickness direction, for example. The reflecting film fixation section 512 is formed at the center portion of the electrode formation groove 511 in the plan view described above so as to protrude from the groove bottom (an electrode fixation surface 511A) of the electrode formation groove 511 toward the side of the movable substrate 52.

Further, the first electrode 551 constituting the electrostatic actuator 55 is formed on the electrode fixation surface 511A of the electrode formation groove 511. Further, the fixed substrate 51 is provided with a first electrode leading groove not shown connected to the electrode fixation surface 511A, and a first electrode leading section not shown extending outward from a part of the outer peripheral edge of the first electrode 551 is provided there. The first electrode leading section is connected to the drive circuit 7.

The width of the reflecting film fixation section 512 is smaller than the width of the electrode formation groove 511. However, the width of the reflecting film fixation section 512 can arbitrarily be set, and can be larger than the width of the electrode formation groove 511. It should be noted that although in the present embodiment there is shown an example in which the reflecting film fixation surface 512A of the reflecting film fixation section 512 opposed to the movable substrate 52 is formed nearer to the movable substrate 52 than the electrode fixation surface 511A as shown in FIG. 2, the structure is not limited thereto. The height positions of the electrode fixation surface 511A and the reflecting film fixation surface 512A are arbitrarily set in accordance with the dimension of the first gap G1 between the fixed reflecting film 53 fixed to the reflecting film fixation surface 512A and the movable reflecting film 54 formed on the movable substrate 52, the dimension of a gap between the first electrode 551 and the second electrode 552 described later formed on the movable substrate 52, and the thickness dimensions of the fixed reflecting film 53 and the movable reflecting film 54, and are not limited to those of the configuration described above. In the case in which dielectric multilayer reflecting films are used as the reflecting films 53, 54, and the thickness dimensions thereof are increased, for example, it is also possible to adopt, for example, the configuration of forming the electrode fixation surface 511A and the reflecting film fixation surface 512A are formed in the same plane, or the configuration in which the reflecting film fixation groove having a columnar groove shape is formed at the central portion of the electrode fixation surface 511A and the reflecting film fixation surface 512A is formed on the bottom of the reflecting film fixation groove.

Further, the fixed reflecting film 53 formed to have a circular shape with a diameter of, for example, 3 mm is fixed to the reflecting film fixation surface 512A. The fixed reflecting film 53 is a reflecting film formed of a single layer of AgC, and is formed on the reflecting film fixation surface 512A using a method such as sputtering.

It should be noted that although in the present embodiment there is shown an example of using the reflecting film of the AgC single layer capable of covering the entire visible light range as the wavelength range the etalon 5 can disperse as the fixed reflecting film 53, the configuration is not limited thereto. For example, there can be adopted the configuration of using, for example, a $TiO_2$—$SiO_2$ dielectric multilayer reflecting film having a narrow wavelength range the etalon 5 can disperse, a larger transmittance of the light beams obtained by the dispersion and a narrower half-value width and more preferable resolution than those of the AgC single layer reflecting film. It should be noted that on this occasion as described above, it is necessary to appropriately set the height positions of the reflecting film fixation surface 512A and the electrode fixation surface 511A of the fixed substrate 51 and so on by the fixed reflecting film 53, the movable reflecting film 54, and the wavelength selection range of the light beam to be dispersed.

Further, the fixed substrate 51 is provided with an antireflection film (AR) not shown formed at a position corresponding to the fixed reflecting film 53 on the lower surface on the opposite side to the upper surface opposed to the movable substrate 52. The antireflection film is formed by alternately stacking low refractive index films and high refractive index films, decreases the reflectance of the visible light on the surface of the fixed substrate 51, and increases the transmittance.

3-1-2. Configuration of Movable Substrate

The movable substrate 52 is formed by processing a glass substrate formed to have a thickness of, for example, 200 μm using an etching process.

Specifically, the movable substrate 52 is provided with a displacement section 521 having a circular shape centered on the central point of the substrate in the etalon-plane view, and a connection holding section 522 having an annular shape concentric with the displacement section 521 and coupled to the outer periphery of the displacement section 521.

The displacement section 521 is formed to have a thickness dimension larger than that of the connection holding section 522, and is formed in the present embodiment, for example, to have the thickness dimension of 200 μm, the same dimension as the thickness dimension of the movable substrate 52. Further, the displacement section 521 is provided with a movable surface 521A parallel to the reflecting film fixation surface 512A of the reflecting film fixation section 512, and the movable reflecting film 54 is fixed to the movable surface 521A. Here, the movable reflecting film 54 and the fixed reflecting film 53 described above constitute the pair of reflecting films according to the invention. Further, in the present embodiment, the first gap G1 between the movable reflecting film 54 and the fixed reflecting film 53 is set to, for example, 450 nm in the initial state.

Here, a reflecting film having the configuration identical to that of the fixed reflecting film 53 described above is used as the movable reflecting film 54, and in the present embodiment, the AgC single layer film is used. Further, the AgC single reflecting film is formed to have a film thickness dimension of, for example, 0.03 μm.

Further, the movable surface 521A is provided with a ring-like second electrode 552 opposed to the first electrode 551 via a second gap G2.

Further, a second electrode leading section not shown is formed outward from a part of the outer peripheral edge of the second electrode 552, and is connected to the drive circuit 7. Further, the electrostatic attractive force acts between the first electrode 551 and the second electrode 552 due to the voltage output from the drive circuit 7, and the displacement section 521 moves toward the reflecting film fixation section 512, thereby controlling the spacing of the first gap G1.

Further, the displacement section 521 is provided with an antireflection film (AR) not shown formed at a position corresponding to the movable reflecting film 54 on the upper surface on the side opposite to the movable surface 521A. The antireflection film has a configuration substantially identical to that of the antireflection film provided to the fixed substrate 51, and is formed by alternately stacking low refractive index films and high refractive index films.

The connection holding section 522 is a diaphragm surrounding the periphery of the displacement section 521, and is formed to have a thickness dimension of, for example, 50

μm. Further, the connection holding section 522 has elasticity, and exerts a bias force so as to restore the displacement section 521 to the initial position when the displacement section 521 moves toward the fixed substrate 51 due to the electrostatic attractive force by the electrostatic actuator 55. In other words, the connection holding section 522 constitutes a bias section according to the invention.

Figure 3:
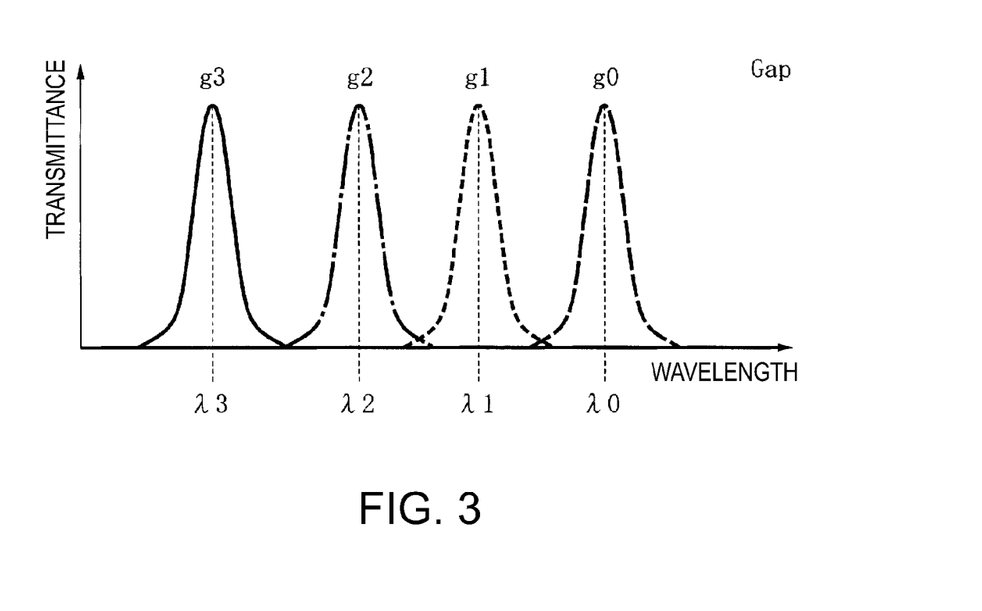
FIG. 3 is a diagram showing an example of the transmission characteristics of the etalon.

In such an etalon 5 as described above, there is provided transmission characteristics shown in FIG. 3. FIG. 3 is a diagram showing the transmission characteristics of the etalon 5. In FIG. 3, "Gap" denotes the spacing of the first gap.

In the etalon 5, the transparent wavelength is determined in accordance with the spacing (hereinafter referred to as a first gap spacing) of the first gap G1 between the pair of reflecting films 53, 54. In other words, the light beam transmitted through the etalon 5 is the light beam having a half wavelength integral multiple of which coincides with the first gap spacing, and the light beam having a half wavelength integral multiple of which fails to coincide with the first gap spacing is reflected by the reflecting films 53, 54. Therefore, as shown in FIG. 3, by changing the first gap spacing to g0, g1, g2, and g3 by the electrostatic actuator 55, the wavelength of the light beam transmitted through the etalon 5, namely the light with a high transmittance, changes to λ0, λ1, λ2, and λ3, respectively.

3-2. Configuration of Drive Circuit

The drive circuit 7 is connected to the first electrode leading section and the second electrode leading section of the etalon 5, and the control circuit section 8. The drive circuit 7 applies the drive voltage between the first electrode 551 and the second electrode 552 via the first electrode leading section and the second electrode leading section based on the drive control signal input from the control circuit section 8 to thereby move the displacement section 521 to a predetermined displacement position.

3-3. Configuration of Control Circuit Section

The control circuit section 8 controls overall operations of the spectral measurement device 3. As shown in FIG. 1, the control circuit section 8 is mainly composed of, for example, a CPU 81 and a storage section 82. Further, the CPU 81 performs a spectral measurement process based on various programs and various data stored in the storage section 82. The storage section 82 is configured including a recording medium such as a memory or a hard disk drive, and stores the various programs and various data so as to be arbitrarily retrieved.

Here, a voltage control program 821, a gap measurement program 822, a light intensity recognition program 823, and a measurement program 824 are stored in the storage section 82 as the programs. Here, the CPU 81 retrieves the voltage control program 821, and then performs the process of the voltage control section according to the invention. Further, the CPU 81 retrieves the gap measurement program 822, and then performs the process of a capacitance measurement section according to the invention. In other words, the CPU 81 constitutes the voltage control section and the capacitance measurement section according to the invention.

Further, the storage section 82 stores voltage table data 825 containing voltage values to be applied to the electrostatic actuator 55 for controlling the spacing of the first gap G1 and the time periods, during which the respective voltage values are applied, in conjunction with each other.

Figure 4:
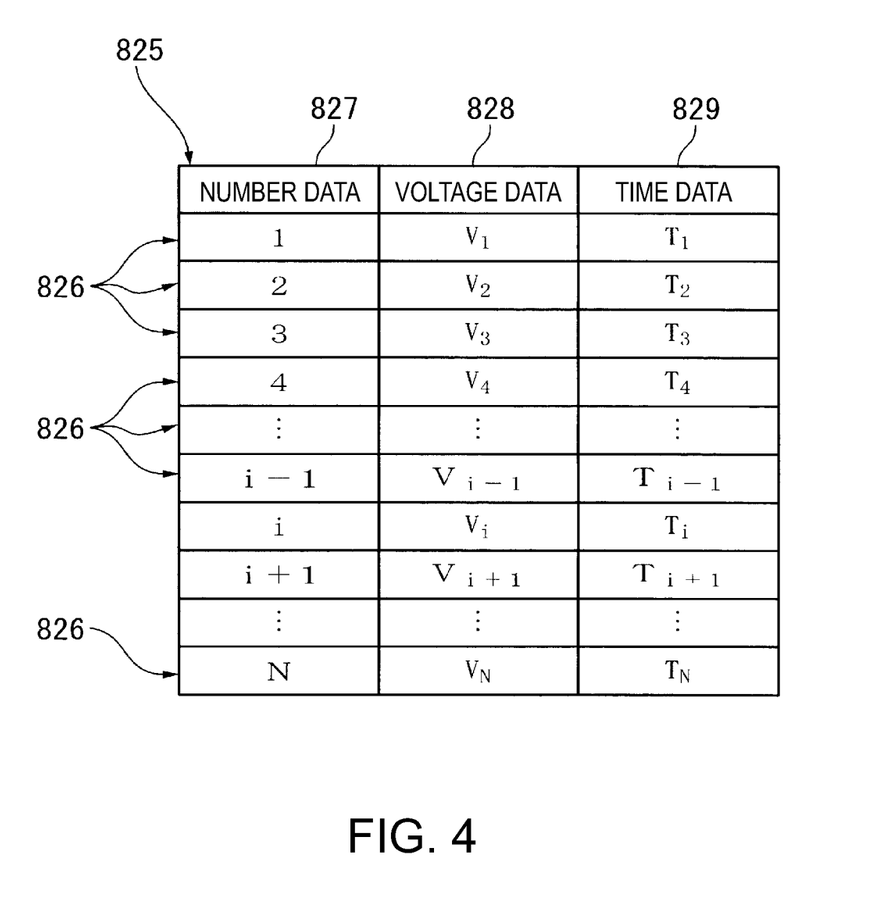
FIG. 4 is a diagram showing an example of voltage table data.

Here, FIG. 4 shows an example of the voltage table data 825.

As shown in FIG. 4, the voltage table data 825 stored in the storage section 82 is the data for recording a plurality of voltage control records 826 each having number data 827 indicating the order of voltage application, voltage data 828 for recording the voltage value, and time data 829 for recording the application time in conjunction with each other.

Here, in the case in which the spectral measurement device 3 divides the dispersion allowable range into N parts, and the light intensities corresponding to N+1 wavelengths are obtained, N voltage control records 826 are recorded in the voltage table data 825 in, for example, the ascending order of the number data 827.

An initial drive voltage to be applied first to the electrostatic actuator 55 when the spectral measurement device 3 performs the spectral measurement is recorded on the voltage data 828 of the voltage control record 826 with the number data 827 of "1." Further, on the voltage data 828 of the voltage control records 826 with the number data 827 equal to or larger than "2," there are recorded the voltage values in such a manner that the smaller the number data 827 is, the lower the voltage value to be recorded is, and the voltage value to be recorded rises as the number data 827 increases.

In other words, the voltage value higher than the initial drive voltage is recorded on the voltage data 828 of the voltage control record 826 with the number data 827 of "2," and further, the voltage value higher than the voltage value of the voltage data 828 of the voltage control record 826 with the number data 827 of "2" is recorded on the voltage data 828 of the voltage control record 826 with the number data 827 of "3." In other words, the voltage value higher than the voltage data 828 of the voltage control record 826 with the number data 827 of "i−1" and lower than the voltage data 828 of the voltage control record 826 with the number data 827 of "i+1" is recorded on the voltage data 828 of the voltage control record 826 with the number data 827 of "i." Further, the highest voltage value for minimizing the first gap spacing is recorded on the voltage data 828 of the voltage control record 826 with the number data 827 of "N." Here, "i" denotes an integer equal to or larger than 2. Further, "N" also denotes an integer equal to or larger than 2.

Further, the voltage variation between the voltage data 828, namely the difference between the voltage value of the voltage data 828 of the voltage control record 826 with the number data 827 of "i−1" and the voltage value of the voltage data 828 of the voltage control record 826 with the number data 827 of "i" is set so as to become smaller as the number data 827 increases.

It should be noted that the voltage data is set appropriately in accordance with the first gap spacing desired to be set, the material of the movable substrate, the area and the thickness of the movable substrate corresponding to the region provided with the movable reflecting film.

The time data 829 of the voltage control record 826 represents a time period during which the voltage of the voltage data 828 described above is continuously applied to the electrostatic actuator 55. The application time corresponds to the time period from when the charge corresponding to the voltage data 828 is held by the first electrode 551 and the second electrode 552 to when the displacement of the displacement section 521 due to the electrostatic attractive force is completed. The smaller the number data 827 is, the shorter the application time recorded on the time data 829 is, and the application time recorded is increased as the number data 827 increases.

In other words, in the case in which the voltage applied to the electrostatic actuator 55 is low, the force acting on the displacement section 521 is weak, while in the case in which the voltage is high, the force acting thereon becomes strong. Here, as the force acting on the displacement section 521, there exist the electrostatic attractive force by the electrostatic actuator 55 and a restoring force, which is a reactive force of the electrostatic attractive force and generated due to the elastic deformation of the connection holding section 522, and the higher the voltage applied to the electrostatic actuator 55 is, the stronger these forces become.

When fluctuating the displacement section 521, there occurs an overshoot, the displacement of the displacement section 521 exceeding the desired displacement position, in some cases, and if such an overshoot occurs, it takes time before the vibration due to the overshoot settles. The stronger the electrostatic attractive force and the restoring force are, the greater the tendency of occurrence of this phenomenon becomes, and the larger the amplitude of the vibration becomes. Therefore, in the case in which a high voltage is applied to the electrostatic actuator 55, it results that longer time is required for the fluctuation of the displacement section 521 to settle, and therefore, it is required to set the application time longer. For the reason described above, the application time to be recorded on the time data 829 of the voltage control record 826 increases as the number data 827 increases.

Further, although not shown in the drawings, on the storage section 82 there are recorded gap characteristic data representing the first gap spacing corresponding to the amount of charge held between the electrodes 551, 552 of the electrostatic actuator 55, transmission characteristic data representing the wavelength of the transmitted light corresponding to the first gap spacing, and so on.

Then, the various programs stored in the storage section 82, and retrieved and then performed by the CPU 81 will be explained.

The voltage control program 821 is a program for making the CPU 81 function as the voltage control section according to the invention, and for performing the control of outputting the drive control signal to the drive circuit 7 to thereby make it drive the electrostatic actuator 55 by applying a step voltage (a direct-current voltage) between the first electrode 551 and the second electrode 552 thereof.

Specifically, there is performed the control of retrieving the voltage control records 826 from the voltage table data 825 stored in the storage section 82 in the ascending order of the number data 827, and then applying the voltage corresponding to the voltage values recorded on the voltage data 828 of the respective voltage control records 826 for the application time periods recorded on the time data 829.

The gap measurement program 822 is a program for making the CPU 81 function as the capacitance measurement section according to the invention, and detects the capacitance between the first electrode 551 and the second electrode 552 to thereby measure the first gap spacing. Specifically, the gap measurement program 822 retrieves the gap characteristic data stored in the storage section 82, and then obtains the first gap spacing corresponding to the amount of the charge held between the electrodes 551, 552 of the electrostatic actuator 55.

The light intensity recognition program 823 obtains the electric signal (a light intensity detection signal) input from the light receiving section 6, and then recognizes the intensity of the light beam transmitted through the etalon 5 and measured by the light receiving section 6.

The measurement program 824 is a program for making the CPU 81 function as the measurement section according to the invention, and performs the control (the spectral measurement process) of simultaneously performing the measurement of the first gap spacing by the gap measurement program 822 and the recognition of the light intensity detection signal corresponding to the received light intensity of the transmitted light by the light intensity recognition program 823.

Here, the measurement program 824 performs the spectral measurement process at the timing when the application time recorded on the time data 829 has elapsed after the voltage is applied to the electrostatic actuator 55 along the voltage control program 821, namely immediately before the voltage based on the subsequent voltage control record 826 is applied along the voltage control program 821.

Further, the measurement program 824 retrieves the transmission characteristic data from the storage section 82, and recognizes the wavelength of the transmitted light beam transmitted through the etalon 5 with respect to the first gap spacing. Then, the measurement program 824 outputs the spectral measurement result, which includes the wavelength of the transmitted light beam and the intensity of the transmitted light beam recognized by the light intensity recognition program 823 in conjunction with each other, to the colorimetric control device 4. It should be noted that it is also possible to adopt the configuration of, for example, storing the spectral measurement result in the storage section 82, and outputting the spectral measurement result to the colorimetric control device 4 after the termination of the spectral measurement process on the measurement wavelength band.

4. Configuration of Colorimetric Control Device

The colorimetric control device 4 is connected to the spectral measurement device 3 and the light source device 2, and performs the control of the light source device 2 and the colorimetric process based on the spectral characteristic obtained by the spectral measurement device 3. As the colorimetric control device 4, a general-purpose personal computer, a handheld terminal, a colorimetric-dedicated computer, and so on can be used.

Further, as shown in FIG. 1, the calorimetric control device 4 is configured including a light source control section 41, a spectral characteristic obtaining section 42, a colorimetric processing section 43, and so on.

The light source control 41 is connected to the light source device 2. Further, the light source control section 41 outputs a predetermined control signal to the light source device 2 based on, for example, a setting input by the user to thereby make the light source device 2 emit a white light beam with a predetermined brightness.

The spectral characteristic obtaining section 42 is connected to the spectral measurement device 3, and obtains the spectral characteristic input from the spectral measurement device 3.

The calorimetric processing section 43 performs the colorimetric process for measuring the chromaticity of the measurement object A based on the spectral characteristic. For example, the colorimetric processing section 43 performs a process of making a graph of the spectral characteristic obtained from the spectral measurement device 3, and then outputting it to an output device such as a printer or a display not shown.

5. Characteristic Measurement Method

Then, a characteristic measurement method in the operation of the spectral measurement device 3 constituting such a colorimetric device 1 will be explained with reference to the drawings.

Figure 5:
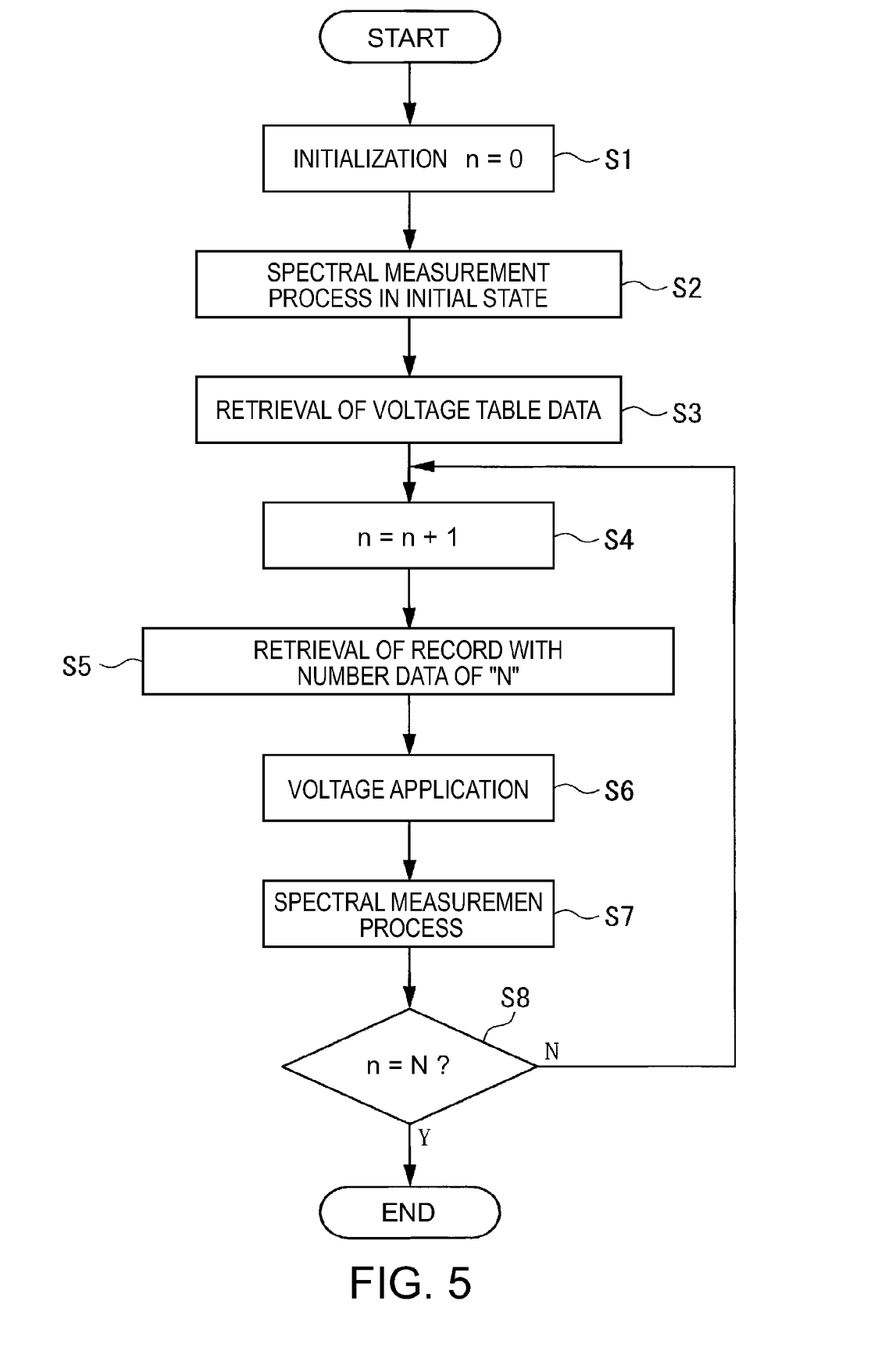
FIG. 5 is a flowchart showing a spectral measurement operation of an optical filter according to the present embodiment.

FIG. 5 is a flowchart showing the spectral measurement operation of the spectral measurement device 3.

In such a colorimetric device 1 as described above, in order for measuring the spectral characteristic of the incident light beam (the test target light beam), the colorimetric control device 4 firstly controls the light source device 2 using the light source control section 41 to irradiate the measurement object A with, for example, a white light beam (a light irradiation process).

Subsequently, the CPU 81 of the control circuit section 8 in the spectral measurement device 3 starts the voltage control program 821, the gap measurement program 822, the light intensity recognition program 823, and the measurement program 824. Further, the CPU 81 initializes a measurement count variable "n" (set n=0) as an initial state (step S1). It should be noted that the measurement count variable n takes an integer value equal to or larger than 0.

Subsequently, the measurement program 824 measures (step S2) the intensity of the light beam transmitted through the etalon 5 in the initial state, namely the state in which no voltage is applied to the electrostatic actuator 55. It should be noted that it is also possible to previously measure the first gap spacing in the initial state, for example, at the time of manufacturing of the spectral measurement device and store it in the storage section 82. Then, the measurement program 824 outputs the intensity of the transmitted light beam and the first gap spacing in the initial state obtained here to the colorimetric control device 4.

Subsequently, the voltage control program 821 retrieves (step S3) the voltage table data 825 stored in the storage section 82. Further, the voltage control program 821 adds (step S4) "1" to the measurement count variable n.

Subsequently, the voltage control program 821 retrieves the voltage control record 826 with the number data 827 equal to the measurement count variable n from the voltage table data 825 to thereby obtain the voltage data 828 and the time data 829 (step S5). Then, the voltage control program 821 performs (step S6) the process of outputting the drive control signal to the drive circuit 7 to thereby apply the voltage recorded on the voltage data 828 to the electrostatic actuator 55 for the period of the application time recorded on the time data 829.

Further, the measurement program 824 performs (step S7) the spectral measurement process at the application time elapse timing. Specifically, the measurement program 824 makes the gap measurement program 822 measure the first gap spacing, and at the same time makes the light intensity recognition program 823 measure the intensity of the transmitted light beam. Further, the measurement program 824 retrieves the transmission characteristic data from the storage section 82, and recognizes the wavelength of the transmitted light beam corresponding to the first gap spacing thus measured. Then, the measurement program 824 performs the control of outputting the spectral measurement result, which includes the intensity of the transmitted light beam thus measured and the wavelength of the transmitted light beam thus recognized in conjunction with each other, to the colorimetric control device 4.

Subsequently, the CPU 81 determines (step S8) whether or not the measurement count variable n reaches the maximum value N, and if it determines that the measurement count variable n is equal to N, it terminates the series of spectral measurement operation. In contrast, if it is determined in the step S8 that the measurement count variable n is smaller than N, the CPU 81 performs the process of adding "1" to the measurement count variable n, and then repeats the process of the steps S5 through S8.

According to the process described above, the first voltage control step, the first measurement step, the second voltage control step, the second measurement step, the third voltage control step, and the third measurement step according to the invention are performed. Specifically, when the measurement count variable is n, the voltage applied between the first electrode 551 and the second electrode 552 corresponds to a first voltage according to the invention, the potential difference corresponds to a first potential difference according to the invention, the gap spacing on this occasion corresponds to a first spacing according to the invention, and the light beam transmitted through the etalon 5 on this occasion corresponds to a first light beam according to the invention. Further, when the measurement count variable n is incremented by one to have a value of n+1, the voltage applied between the first electrode 551 and the second electrode 552 corresponds to a second voltage according to the invention, the potential difference corresponds to a second potential difference according to the invention, the gap spacing on this occasion corresponds to a second spacing according to the invention, and the light beam transmitted through the etalon 5 on this occasion corresponds to a second light beam according to the invention. Still further, when the measurement count variable n is incremented by one to have a value of n+2, the voltage applied between the first electrode 551 and the second electrode 552 corresponds to a third voltage according to the invention, the potential difference corresponds to a third potential difference according to the invention, the gap spacing on this occasion corresponds to a third spacing according to the invention, and the light beam transmitted through the etalon 5 on this occasion corresponds to a third light beam according to the invention.

Figure 6:
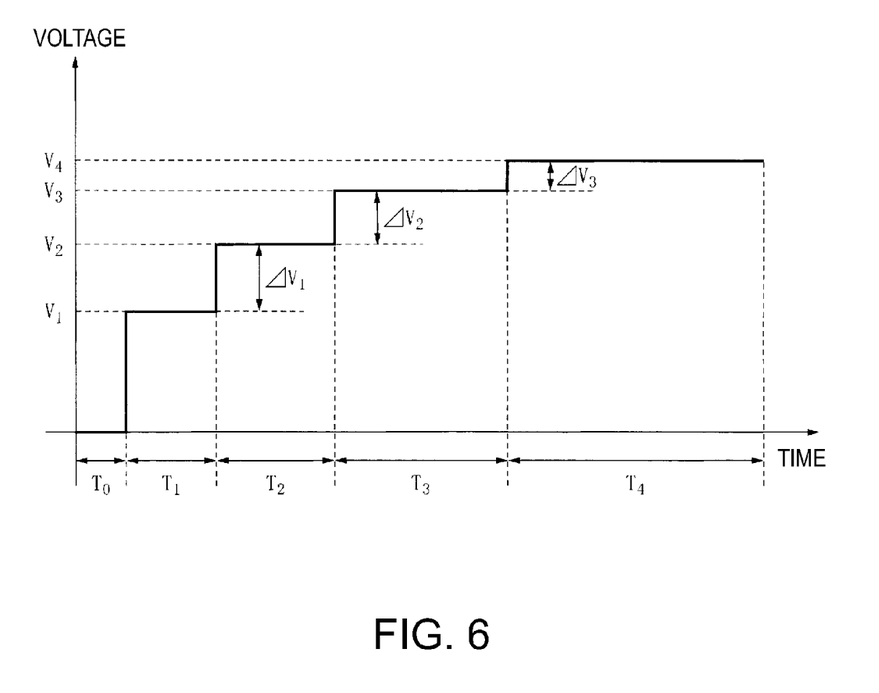
FIG. 6 is a diagram showing a voltage applied to an electrostatic actuator and voltage application time thereof in the present embodiment.

FIG. 6 is a diagram showing a voltage applied to the electrostatic actuator 55 and the voltage application time thereof in the present embodiment.

According to the spectral measurement operation described above, a step voltage shown in FIG. 6 is applied to the electrostatic actuator 55 of the etalon 5. On this occasion, as described above, it is arranged that the voltage variation $\Delta V$ at the voltage transition becomes smaller ($\Delta V_1 > \Delta V_2 > \Delta V_3$) as the first gap spacing is narrowed due to application of a higher voltage. In the present embodiment, $V_1=15V$, $V_2=25V$, $V_3=30V$, and $V_4=33V$ are set, and therefore, $\Delta V_1=10V$, $\Delta V_2=5V$, and $\Delta V_3=3V$ are set. By setting $\Delta V_1 > \Delta V_2 > \Delta V_3$, the overshoot of the displacement section 521 is suppressed.

Further, as shown in FIG. 6, the application time T is set so as to be longer ($T_1 < T_2 < T_3 < T_4$) as the first gap spacing is narrowed due to the application of the higher voltage. In the present embodiment, $T_1=100$ μsec, $T_2=150$ μsec, $T_3=200$ μsec, and $T_4=250$ μsec are set. By setting $T_1 < T_2 < T_3 < T_4$, it is possible to further prevent the electrostatic attractive force from rapidly increasing, and further prevent the overshoot of the displacement section 521 from occurring, thus the prompter measurement becomes possible. Further, although the electrostatic attractive force and the restoring force acting on the displacement section 521 increase as the application voltage increases, the application time T is set so as to increase as the application voltage increases as described above. Therefore, it becomes possible to perform the measurement at the timing when the fluctuation of the displacement section 521 settles even in the case in which the overshoot occurs due to these forces, and therefore, the degradation of the accuracy of the spectral measurement process due to the vibration of the displacement section 521 can be eliminated. On the other hand, in the condition in which the voltage applied to the electrostatic actuator 55 is low, the electrostatic attractive force and the restoring force become weaker, and therefore, the fluctuation of the displacement section 521 also becomes small. In the present embodiment, when the application voltage is low, the application time is also set shorter, and it becomes possible to perform the prompter measurement. It should be noted that $T_0$ in FIG. 6 represents the period of the initial state. Further, FIG. 6 shows the case of performing the spectral measurement 4 times as an example. Specifically, the first measurement is performed at $T_1$ ($V_1$), the second measurement is performed at $T_2$ ($V_2$), the third measurement is performed at $T_3$ ($V_3$), and the fourth (the last) measurement is performed at $T_4$ ($V_4$). In order for preventing the overshoot, $V_1<V_2<V_3<V_4$ is satisfied. After the termination of the last measurement, when performing the spectral measurement on the chromaticity of another region of the measurement object A, the spectral measurement of the present embodiment is performed again after restoring the etalon 5 to the initial state.

6. Functions and Advantages of Embodiment

As described above, in the spectral measurement device 3 of the colorimetric device 1 according to the present embodiment, the CPU 81 performs the process of switching the voltage to be applied to the electrostatic actuator 55 from a low voltage to a high voltage when measuring the light intensity of each of the plurality of dispersed light beams of respective wavelengths by displacing the displacement section 521 in the spectral measurement along the voltage control program 821.

Therefore, the fluctuation of the displacement section 521 caused when switching the voltage to the electrostatic actuator 55 can be stabilized quickly. In other words, by switching the voltage from the low voltage to the high voltage, the restoring force, which is a reactive force of the electrostatic attractive force, can be prevented from increasing, and the displacement speed of the displacement section can be reduced. Therefore, the problem that the displacement section 521 overshoots to cause a vibration can be prevented. Therefore, it becomes possible to decrease the time period from the voltage application timing to the measurement timing, and thus, the prompt spectral measurement process can be performed. Further, since the vibration of the displacement section 521 can be suppressed, the deterioration of the measurement accuracy due to the vibration of the displacement section 521 at the measurement can also be suppressed, and the measurement accuracy of the spectral measurement device 3 can be improved.

Further, the CPU 81 applies the voltage to the electrostatic actuator 55 in the ascending order of the application voltage while switching the applied voltage a plurality of times from the initial state in which the first gap spacing is the largest to the maximum voltage application state in which the first gap spacing is the smallest based on the data of the voltage table data 825 along the voltage control program 821.

Therefore, it becomes possible to measure the spectral characteristics of a plurality of wavelength with respect to the wavelength band the etalon 5 can disperse.

Further, by varying the voltage with small steps, the electrostatic attractive force can be prevented from rapidly increasing, and the overshoot thereof can preferably be suppressed. Therefore, the spectral measurement process can more promptly be performed.

Moreover, in the voltage table data 825 described above, the voltage data 828 is set so that the voltage variation decreases as the voltage value increases, and the CPU 81 controls the application of the voltage to the electrostatic actuator 55 along the voltage control program 821 so that the voltage variation becomes smaller as the voltage is switched from the lower voltage to the higher voltage.

Therefore, when the first gap spacing becomes small, the variation of the voltage at the transition of the voltage to be applied to the electrostatic actuator 55 is small, and therefore, the electrostatic attractive force can be prevented from increasing rapidly. Therefore, the overshoot due to the rapid increase in the electrostatic attractive force, and the vibration of the displacement section 521 due to the overshoot can be reduced, and therefore, the spectral measurement process can promptly be performed.

Further, in the voltage table data 825 described above, the time data 829 is set so that the application time increases as the voltage value increases, and the CPU 81 controls the application of the voltage to the electrostatic actuator 55 along the voltage control program 821 so that the application time during which the voltage is continuously applied to the electrostatic actuator 55 increases as the voltage is switched from the lower voltage to the higher voltage.

Therefore, even in the case in which the electrostatic attractive force and the restoring force opposing the electrostatic attractive force increase when applying a high voltage to the electrostatic actuator 55, and the displacement section 521 problematically vibrates due to the interaction between the forces, the application time necessary for the fluctuation of the displacement section 521 to settle is set, and therefore, the displacement section 521 can be prevented from vibrating at the measurement. In other words, the CPU 81 can perform the spectral measurement process at the timing when the fluctuation of the first gap spacing settles along the measurement program 824, and thus the spectral measurement result with high accuracy can be obtained.

On the other hand, in the case in which the voltage applied to the electrostatic actuator 55 is low, the electrostatic attractive force and the restoring force become weaker, and therefore, the displacement section 521 settles at a predetermined position in a short period of time with little vibration. In the spectral measurement device 3 according to the present embodiment, since the lower the voltage to be applied to the electrostatic actuator 55 is, the shorter the application time becomes, the spectral measurement process along the measurement program 824 can more promptly be performed when applying a lower voltage.

Further, the CPU 81 measures the intensity of the light beam dispersed by and then transmitted through the etalon 5, and at the same time, performs the measurement of the first gap spacing. Further, when the first gap spacing is measured, the wavelength of the transmitted light beam can be obtained, and therefore, the wavelength and the intensity of the transmitted light beam can simultaneously be obtained.

Here, although it is possible to adopt the configuration of previously measuring the first gap spacing corresponding to the voltage applied to the electrostatic actuator 55 and then storing as the data, in this case, the first gap spacing when applying a predetermined voltage is different between the etalons 5 due to the thickness dimension of the electrode and so on, and therefore, it becomes necessary to measure the first gap spacing corresponding to the application voltage in each of the spectral measurement devices, which makes the manufacturing process complicated. Further, the first gap spacing when applying a predetermined voltage might be fluctuated in some cases due to the measurement environment, and it is possible that the measurement accuracy is degraded. In contrast thereto, in the method of obtaining the first gap spacing based on the amount of the charge held between the electrodes 551, 552 of the electrostatic actuator 55, the accurate value can be obtained as described above. Therefore, the wavelength of the transmitted light beam with respect to the first gap spacing can also be obtained accurately. Thus, the wavelength and the intensity of the light dispersed by and then transmitted through the etalon 5 can accurately be measured, and the spectral measurement process with high accuracy can be performed.

Further, in the colorimetric device 1 according to the invention, the colorimetric process is performed along the measurement program 824 based on the spectral measurement result obtained by the spectral measurement device 3. As described above, since the accurate spectral measurement result can promptly be output from the spectral measurement device 3, the prompt process is also possible in the colorimetric process in the colorimetric device 1, and therefore, the accurate colorimetric process can be performed.

MODIFIED EXAMPLES

It should be noted that the invention is not limited to the embodiment described above but includes modifications and improvements within a range where the advantages of the invention can be achieved.

For example, although in the embodiment described above, the range from the initial drive voltage to the maximum drive voltage is divided into a plurality of stages, and the measurement is performed a plurality of times, it is also possible to perform two stages of process of switching the voltage from the first voltage as a low voltage to the second voltage as a high voltage. Also in this case, since the voltage to be applied to the electrostatic actuator 55 is switched from the lower voltage to the higher voltage, the fluctuation of the displacement section 521 can be reduced, and thus the prompt spectral measurement can be performed compared to the case of switching the voltage from the higher voltage to the lower voltage.

Further, although in the embodiment described above, the CPU 81 performs the control of reducing the voltage variation as switching the voltage applied to the electrostatic actuator 55 to the higher voltage along the voltage control program 821, the invention is not limited thereto, but it is also possible to perform the process of, for example, setting the voltage after switching to the voltage obtained by subtracting a predetermined voltage from the previous voltage to thereby reduce the voltage variation.

Further, it is also possible to adopt the control of setting the voltage variation constant in every switching of the voltage applied to the electrostatic actuator 55. Also in this case, by switching the voltage to be applied to the electrostatic actuator 55 from the lower voltage to the higher voltage, the overshoot of the displacement section 521 can be reduced in comparison with the case of switching the voltage from the higher voltage to the lower voltage, and therefore acceleration of the spectral measurement operation can be achieved.

Further, although the CPU 81 performs the control of increasing the application time as switching the voltage applied to the electrostatic actuator 55 to the higher voltage along the voltage control program 821, the invention is not limited thereto. For example, it is also possible to perform the control of setting the application time before the fluctuation of the displacement section 521 settles when applying a higher voltage to a fixed time period, and applying the voltage for the fixed time period at every switching of the voltage to any voltage. In this case, although the time necessary for the measurement is longer in comparison with the embodiment described above, since the control of switching the voltage applied to the electrostatic actuator 55 from the lower voltage to the higher voltage is performed along the voltage control program 821, the length of the fixed time period is set shorter than in the case of performing the control of switching the voltage from the higher voltage to the lower voltage. In other words, the prompt spectral measurement process can be performed compared to the case of switching the voltage from the higher voltage to the lower voltage.

Further, although there is adopted the configuration in which the CPU 81 performs the measurement of the light intensity and the measurement of the first gap spacing at the same time along the measurement program 824, the invention is not limited thereto. For example, as described above, in the case in which the first gap spacing corresponding to the voltage to be applied to the electrostatic actuator 55 is previously measured and then held as data, it is not necessary to measure the first gap spacing based on, for example, the amount of the charge held in the electrostatic actuator, but the wavelength of the transmitted light beam can be obtained based on the data. In such a case, it is necessary to measure the data inherent to the individual spectral measurement device 3 in the manufacturing process as described above, and it is necessary to keep the measurement environment constant. However, it becomes possible to simplify the process, and to perform the measurement with a reduced processing load of the CPU 81.

Further, although there is adopted the configuration in which the CPU 81 measures the charge holding capacitance between the first electrode 551 and the second electrode 552 of the electrostatic actuator 55 along the gap measurement program 822, it is also possible to adopt a configuration of, for example, providing measuring electrostatic drive electrodes for measuring the first gap spacing to the outer peripheral edges of the reflecting films 53, 54. Alternatively, it is also possible to dispose a piezoelectric element between the displacement section 521 and the reflecting film fixation section 512, and detect the value of the current output in accordance with the displacement of the piezoelectric element, or other configurations of measuring the first gap spacing with any measure can also be adopted.

Further, although in the embodiment described above, there is shown an example of providing the displacement section 521 only to the movable substrate as one of the pair of substrates, it is also possible to adopt a configuration in which the reflecting film fixation section 512 of the fixed substrate 51 is also displaceable.

Although in the embodiment described above the configuration of receiving the light beam transmitted through the etalon 5 by the light receiving section 6 is adopted, the invention is not limited thereto. For example, it is also possible to adopt a configuration of receiving the light beam reflected by the etalon 5 by the light receiving section.

Further, although there is shown the example in which the colorimetric device 1 is provided with the light source device 2 for irradiating the measurement object A with the light, in the case of, for example, setting the display device such as a display of light-emitting type to the measurement object A, it is also possible to adopt a configuration without providing the light source device 2.

Further, although there is described the configuration as an example in which the light beam emitted from the light source device 2 is reflected by the measurement object A, and the spectral measurement device 3 measures the reflected light beam, it is also possible to adopt a configuration in which the light beam transmitted through the etalon 5 is reflected by the measurement object A, and is then received by the light receiving section 6.

Further, although in the embodiment described above, there is described the configuration example as software in which the voltage control program 821, the gap measurement program 822, the light intensity recognition program 823, and the measurement program 824 are programs stored in the storage section 82, and retrieved and then executed by the CPU 81, the invention is not limited thereto. For example, those configured as hardware using, for example, an integrated circuit such as a so-called IC are also possible. In other words, the voltage control section, the capacitance measurement section, and the measurement section in the invention can be configured as hardware such as a circuit.

Further, although in the embodiment described above, the colorimetric device 1 for measuring the chromaticity of the test target light beam is illustrated as the analytical instrument according to the invention, the invention is not limited thereto. Specifically, the invention can be applied to a gas sensor for performing gas detection by detecting the absorption wavelength unique to the gas, for example, as the analytical instrument.

Further, although the configuration of using the optical filter as the spectral measurement device 3, and mounting it on the colorimetric device 1 as the analytical instrument is illustrated, the optical filter can be mounted on an optical device.

In this case, the optical device is provided with the optical filter according to the invention, and an optical decode device for retrieving data from a light beam. In such an optical device, the optical filter extracts the light beams with desired wavelengths from the light beam transmitted by a light transmission medium such as an optical fiber in a descending order of the wavelength, and the optical decode device performs a decode process on the desired wavelength extracted by the optical filter to thereby extract the data included in the wavelength. In such an optical device, since the light beams of the respective wavelengths can promptly be extracted using the optical filter as described above, the process of extracting the data from the transmitted light can also be started promptly, and therefore, prompt data reception becomes possible.

Besides the above, specific structures and procedures to be adopted when putting the invention into practice can arbitrarily be replaced with other structures and so on within the range in which the advantage of the invention can be achieved.

The entire disclosure of Japanese Patent Application No. 2010-010716, filed Jan. 21, 2010 is expressly incorporated by reference herein.

What is claimed is:

1. An optical filter comprising:
a first substrate;
a second substrate opposed to the first substrate;
a first reflecting film provided to the first substrate;
a second reflecting film provided to the second substrate, and opposed to the first reflecting film;
a first electrode provided to the first substrate;
a second electrode provided to the second substrate, and opposed to the first electrode; and
a voltage controller that controls an electrical potential between the first electrode and the second electrode,
wherein when switching a wavelength of a light beam to be dispersed by switching the electrical potential between the first electrode and the second electrode, and measuring an intensity of the light beam dispersed,
the voltage controller switches the electrical potential from a first electrical potential to a second electrical potential larger than the first electrical potential,
a time period during which the second electrical potential is set is longer than a time period during which the first electrical potential is set,
the voltage controller sets the electrical potential between the first electrode and the second electrode to a third electrical potential larger than the second electrical potential, and switches the electrical potential from the second electrical potential to the third electrical potential, and
an absolute value of a difference between the second electrical potential and the third electrical potential is smaller than an absolute value of a difference between the first electrical potential and the second electrical potential.

2. The optical filter according to claim 1, wherein
the voltage controller applies a first voltage to the first electrode when setting the first electrical potential, and applies a second voltage to the first electrode when setting the second electrical potential,
the first voltage is a first direct-current voltage, and
the second voltage is a second direct-current voltage.

3. The optical filter according to claim 1, further comprising:
a light receiver that receives a light beam transmitted through the first reflecting film and the second reflecting film; and
an intensity detector that measures a received light intensity of the light beam received by the light receiver,
wherein the intensity detector measures the received light intensity of a first light beam transmitted through the first reflecting film and the second reflecting film when the first electrical potential is set, and measures the received light intensity of a second light beam transmitted through the first reflecting film and the second reflecting film when the second electrical potential is set.

4. The optical filter according to claim 1, wherein
a first spacing is set between the first reflecting film and the second reflecting film when the first electrical potential is set,
a second spacing smaller than the first spacing is set between the first reflecting film and the second reflecting film when the second electrical potential is set,
a third spacing smaller than the second spacing is set between the first reflecting film and the second reflecting film when the third electrical potential is set, and
an absolute value of a difference between the first spacing and the second spacing is equal to an absolute value of a difference between the second spacing and the third spacing.

5. The optical filter according to claim 1, further comprising:
a capacitance detector that measures a capacitance between the first electrode and the second electrode.

6. An optical filter comprising:
a first reflecting film that reflects a light beam and that transmits a light beam with a specific wavelength;
a second reflecting film that is disposed so as to be opposed to the first reflecting film via a gap, that reflects a light beam and that transmits a light beam with a specific wavelength;
a first electrode;
a second electrode disposed so as to be opposed to the first electrode; and
a voltage controller that controls an electrical potential between the first electrode and the second electrode,
wherein when switching a wavelength of a light beam to be dispersed by switching the electrical potential between the first electrode and the second electrode, and measuring an intensity of the light beam dispersed,
the voltage controller switches the electrical potential from a first electrical potential to a second electrical potential larger than the first electrical potential to thereby control the gap,
a time period during which the second electrical potential is set is longer than a time period during which the first electrical potential is set,
the voltage controller sets the electrical potential between the first electrode and the second electrode to a third electrical potential larger than the second electrical potential, and switches the electrical potential from the second electrical potential to the third electrical potential, and an absolute value of a difference between the second electrical potential and the third electrical potential is smaller than an absolute value of a difference between the first electrical potential and the second electrical potential.

7. A characteristic measurement method that measures a characteristic of a measurement object, comprising:
(a) providing an etalon including a first substrate, a second substrate opposed to the first substrate, a first reflecting film provided to the first substrate, a second reflecting film provided to the second substrate and opposed to the first reflecting film, a first electrode provided to the first substrate, and a second electrode provided to the second substrate and opposed to the first electrode, and an optical filter device including a voltage controller that sets an electrical potential between the first electrode and the second electrode to one of a first electrical potential and a second electrical potential larger than the first electrical potential, a light receiver that receives a light beam transmitted through the etalon, and an intensity detector that measures an intensity of the light received by the light receiver;
(b) irradiating the measurement object with a light beam;
(c) setting, by the voltage controller, the first electrical potential, and separating a first light beam from the light beam entering the etalon after being one of transmitted through and reflected by the measuring object;
(d) receiving the first light beam by the light receiver and measuring, by the intensity detector, a first received light intensity of the first light beam received;
(e) setting, by the voltage controller, the second electrical potential instead of the first electrical potential, and separating a second light beam from the light beam entering the etalon after being one of transmitted through and reflected by the measuring object;
(f) receiving the second light beam by the light receiver and measuring, by the intensity detector, a second received light intensity of the second light beam received;
(g) setting, by the voltage controller, the electrical potential between the first electrode and the second electrode to a third electrical potential larger than the second electrical potential, and separating a third light beam from the light beam entering the etalon after being one of transmitted through and reflected by the measuring object after step (f); and
(h) receiving the third light beam by the light receiver and measuring, by the intensity detector, a third received light intensity of the third light beam received, wherein
a time period during which the second electrical potential is set in step (e) is longer than a time period during which the first electrical potential is set in step (c), and
an absolute value of a difference between the second electrical potential and the third electrical potential is smaller than an absolute value of a difference between the first electrical potential and the second electrical potential.

8. The characteristic measurement method according to claim 7, wherein a first voltage is applied to the first electrode in step (c), and a second voltage is applied to the first electrode in step (e),
the first voltage is a first direct-current voltage, and
the second voltage is a second direct-current voltage.

9. The characteristic measurement method according to claim 7,
wherein a first spacing is set between the first reflecting film and the second reflecting film in step (c),
a second spacing smaller than the first spacing is set between the first reflecting film and the second reflecting film in step (e),
a third spacing smaller than the second spacing is set between the first reflecting film and the second reflecting film in step (g), and
an absolute value of a difference between the first spacing and the second spacing is equal to an absolute value of a difference between the second spacing and the third spacing.

10. The characteristic measurement method according to claim 7, wherein
the optical filter includes a capacitance detector that measures a capacitance between the first electrode and the second electrode,
in step (d), the capacitance detector measures the capacitance between the first electrode and the second electrode in addition to measuring the first received light intensity of the first light beam, and
in step (f), the capacitance detector measures the capacitance between the first electrode and the second electrode in addition to measuring the second received light intensity of the second light beam.

11. An optical filter comprising:
a first reflecting film that partially reflects light input to the first reflecting film and that partially transmits the light;
a second reflecting film that is located opposite to the first reflecting film via a gap, that partially reflects the light input to the first reflecting film and that partially transmits the light;
a first electrode;
a second electrode that is located opposite to the first electrode; and
a voltage controller that controls an electrical potential between the first electrode and a second electrode, wherein
the voltage controller switches the electrical potential from a first electrical potential to a second electrical potential and switches the electrical potential from the second electrical potential to a third electrical potential, based on Formulas below, to thereby control the gap:

$$V1<V2<V3;$$

$$V2-V1>V3-V2; \text{ and}$$

$$T1<T2<T3;$$

where V1 represents the first electrical potential, V2 represents the second electrical potential, V3 represents the third electrical potential, T1 is a time period during which the first electrical potential is set, T2 is a time period during which the second electrical potential is set, and T3 is a time period during which the third electrical potential is set.

* * * * *